United States Patent
Jamshidi et al.

(10) Patent No.: US 8,160,539 B1
(45) Date of Patent: Apr. 17, 2012

(54) LOCATION PROVISIONING FOR 911 CALLS RECEIVED AT A TELECOMMUNICATIONS RELAY SERVICE

(75) Inventors: Talat Jamshidi, Leawood, KS (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 349 days.

(21) Appl. No.: 12/511,490

(22) Filed: Jul. 29, 2009

(51) Int. Cl.
*H04M 11/04* (2006.01)

(52) U.S. Cl. .................. 455/404.1; 455/404.2; 455/521; 455/414.2; 379/52; 379/37

(58) Field of Classification Search .................. 455/404, 455/404.1, 404.2, 521, 414.1–414.4, 415, 455/416, 417, 456.1; 379/52, 37, 45, 49, 379/202.01–207.01; 348/14.08; 320/260, 320/261; 709/204
See application file for complete search history.

(56) References Cited

U.S. PATENT DOCUMENTS

| | | | |
|---|---|---|---|
| 5,432,837 | A | 7/1995 | Engelke et al. |
| 6,757,542 | B2 | 6/2004 | Bruin et al. |
| 7,907,551 | B2 * | 3/2011 | Croy et al. .................... 370/261 |
| 2003/0002650 | A1 * | 1/2003 | Gruchala et al. .............. 379/245 |
| 2004/0100897 | A1 | 5/2004 | Shattil |
| 2005/0004801 | A1 | 1/2005 | Liebermann |
| 2006/0039312 | A1 | 2/2006 | Walton et al. |
| 2007/0049283 | A1 | 3/2007 | Kim et al. |
| 2007/0280428 | A1 * | 12/2007 | McClelland .................... 379/37 |
| 2008/0123821 | A1 | 5/2008 | Goldman et al. |

* cited by examiner

*Primary Examiner* — Marivelisse Santiago Cordero
*Assistant Examiner* — Marisol Fahnert

(57) ABSTRACT

A call processing system is configured to receive a call request for a first call from a mobile device operated by a user, wherein the call request comprises a user input and a caller identification, transfer a key and the caller identification to a call conference server, transfer the caller identification, the key, and a service number to a public safety answering point, and transfer the service number to the mobile device. The call conference server is configured to store the key and the caller identification, receive a second call from the public safety answering point that includes the key, receive a third call from a telecommunications relay service that includes the caller identification, and connect the third call to the second call based on the caller identification and the key.

20 Claims, 5 Drawing Sheets

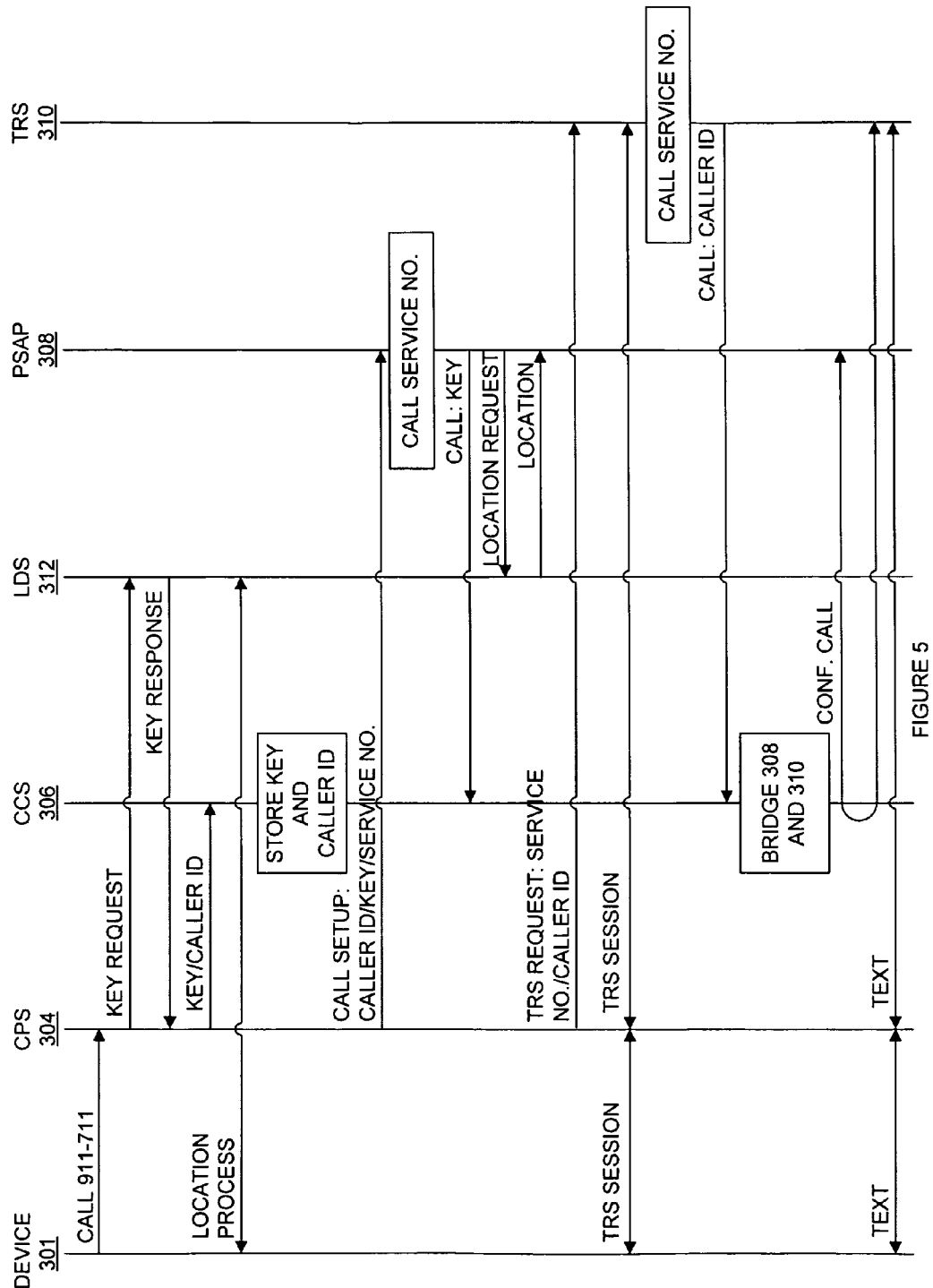

LOCATION PROVISIONING FOR 911 CALLS RECEIVED AT A TELECOMMUNICATIONS RELAY SERVICE

TECHNICAL BACKGROUND

Telecommunication carriers provide customers with emergency calling services. In an emergency, a caller dials 911 from a telephone and the call is routed by the carrier to a public safety answering point (PSAP) facility. In addition, when an emergency call is placed a location process is automatically initiated in order to determine the location of the telephone. For instance, landline callers can be located based on their phone number. In the case of a wireless caller, the location can be determined by a variety of different methods, such as such as providing the location of the cell tower servicing a call to a PSAP, triangulation techniques, and a global position system (GPS) located within the mobile phone.

However, if a hearing or speech impaired individual dials 911, his or her location can be determined but he or she will not be able to communicate with the 911 operator. Alternatively, a hearing or speech impaired individual can place an emergency call to a telecommunications relay service (TRS). TRS (also known as Relay Service, or IP-Relay) allows people who are hearing impaired or speech disabled to place calls to standard telephone users. In an emergency, a hearing impaired person places an emergency call to the TRS, which in turn places a call to the PSAP. The TRS operator then relays typed messages from the hearing impaired caller as voice messages to the PSAP, and vice-versa.

While it is possible to determine the location of a caller who places an emergency call by dialing 911 regardless of whether a landline or mobile phone is used, present systems cannot determine the location of an emergency call placed by a caller who places an emergency call through a TRS. Therefore, if a hearing impaired individual needs to call 911, the TRS operator must ask for the street address, city, and state that the call is originating from. If this information is not provided, then the TRS operator will be unable to process the call.

OVERVIEW

Generally, a communication system comprising a call processing system and a call conference server is described herein. The call processing system is configured to receive a call request for a first call from a mobile device operated by a user, wherein the call request comprises a user input and a caller identification, transfer a key and the caller identification to a call conference server, transfer the caller identification, the key, and a service number to a public safety answering point, and transfer the service number to the mobile device. The call conference server is configured to store the key and the caller identification, receive a second call from the public safety answering point that includes the key, receive a third call from a telecommunications relay service that includes the caller identification, and connect the third call to the second call based on the caller identification and the key. A method of operating a communication system is also described herein.

BRIEF DESCRIPTION OF THE DRAWINGS

FIG. 5 is a flow diagram illustrating the operation of communication system 300.

DETAILED DESCRIPTION

Figure 1:
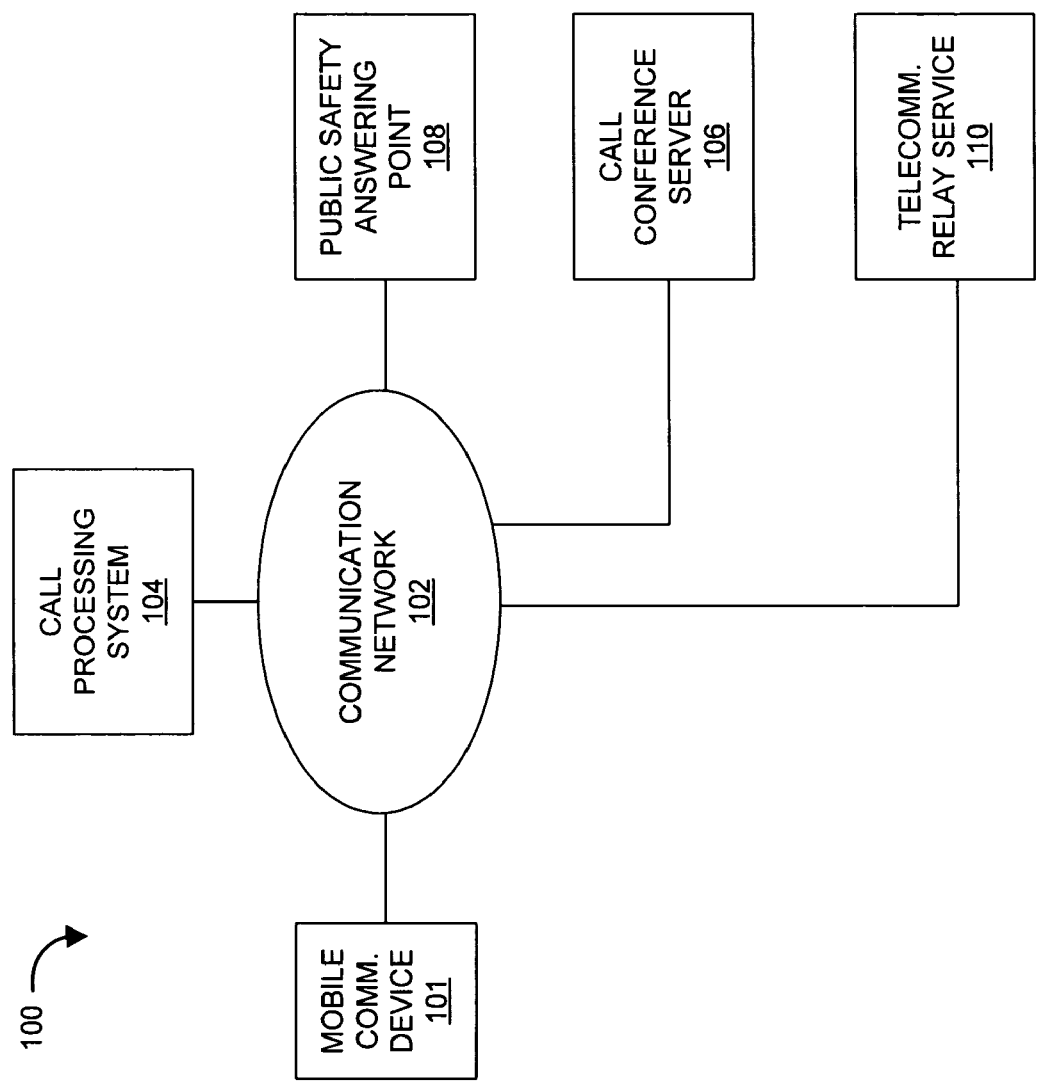
FIG. 1 is a block diagram illustrating communication system 100.

FIG. 1 is a block diagram illustrating communication system 100. Communication system 100 includes mobile communication device 101, communication network 102, call processing system 104, call conference server 106, public safety answering point 108, and telecommunications relay service 110. Mobile communication device 101 communicates with communication network 102. Communication network 102 is coupled to call processing system 104, call conference server 106, public safety answering point 108, and telecommunications relay service 110. Call processing system 104 communicates with call conference server 106, public safety answering point 108, and telecommunications relay service 110 through communication network 102. Call conference server 106 communicates with public safety answering point 108 and telecommunications relay service 110 through communication network 102. Thus, mobile communication device 101 communicates with public safety answering point 108 and telecommunications relay service 110 over the systems and networks described above.

Figure 2:
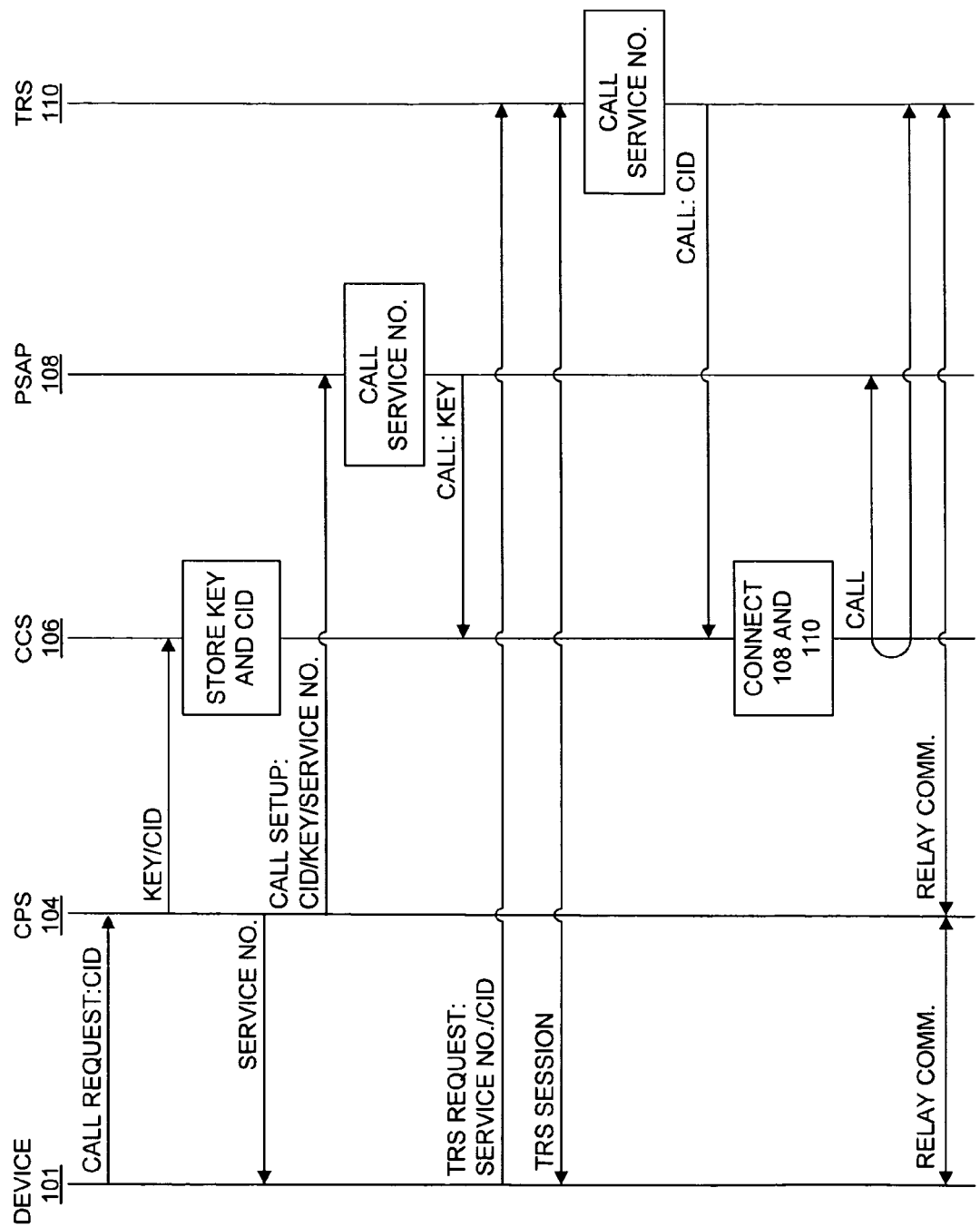
FIG. 2 is a flow diagram illustrating the operation of communication system 100.

FIG. 2 is a flow diagram illustrating the operation of communication system 100. As shown in FIG. 2, call processing system 104 receives a call request from mobile communication device 101. The call request comprises a caller identification. The caller identification could be a telephone number associated with mobile communication device 101, a name associated with the telephone number of mobile communication device 101, or both.

Call processing system 104 then transmits a key and the caller identification to call conference server 106. The key will be used going forward to identify the call. In response, call conference server 106 stores the key and the caller identification. Call processing system 104 also transmits a service number to mobile communication device 101. Additionally, call processing system 104 transmits call setup signaling to public safety answering point 108. The call setup signaling comprises the key, the caller identification, and the service number.

After call processing system 104 transmits the call setup signaling to public safety answering point 108, call conference server 106 receives a call from public safety answering point 108. The call from public safety answering point 108 is made using the service number received from call processing system 104. Additionally, the call comprises the key.

Mobile communication device 101 transmits a telecommunications relay service (TRS) request to telecommunications relay service 110. The TRS request comprises the service number and the caller identification. Additionally, after the TRS request is received by telecommunications relay service 110, a TRS session is established between mobile communication device 101 and telecommunications relay service 110. The TRS session allows the hearing impaired or speech disabled user of mobile communication device 101 to communicate with an operator at telecommunications relay service 110 via a telephone typewriter (TTY), a voice carry over (VCO), a personal computer, or any other type of assistive telephone device.

After telecommunications relay service 110 receives the TRS request call from mobile communication device 101, call conference server 106 receives a call from telecommunications relay service 110. The call from telecommunications relay service 110 is made using the service number received from mobile communication device 101. Additionally, the call comprises the caller identification, which is used by call conference server 106 to connect telecommunications relay service 110 to the conference bridge used to host the conference call with public safety answering point 108. After receiving the calls from public safety answering point 108 and telecommunications relay service 110, call conference server 106 connects the calls to each other to create a conference call.

Upon completion of the conference call setup between public safety answering point 108 and telecommunications relay service 110, the user of mobile communication device 101 will be able to communicate with the telecommunications relay service 110 operator with an assistive telephone device. Accordingly, this will allow the user to provide information relating to the emergency call to the operator at telecommunications relay service 110, who can in turn relay that information to the operator at public safety answering point 108.

Referring back to FIG. 1, mobile communication device 101 comprises Radio Frequency (RF) communication circuitry and an antenna. The RF communication circuitry typically includes an amplifier, filter, modulator, and signal processing circuitry. Mobile communication device 101 may also include a user interface, memory device, software, processing circuitry, or some other communication components. Mobile communication device 101 is any device capable of placing an emergency call to communication network 102. Mobile communication device 101 may be a mobile phone, a personal computer, a laptop, or a personal digital assistant (PDA), as well other types or combinations of mobile communication devices.

Communication network 102 comprises wireless communication networks, wireline communication networks, or packet communication networks, as well as any combination or variation thereof. Communication network 102 communicates with mobile communication device 101, call processing system 104, call conference server 106, public safety answering point 108, and telecommunications relay service 110.

Call processing system 104 comprises a computer system and a communication interface. Call processing system 104 may also include other components such a router, server, data storage system, and power supply. Call processing system 104 may reside in a single device or may be distributed across multiple devices. Call processing system 104 could be a mobile switching center, an IP multimedia subsystem, a base station controller, an access service node, or any other type, combination, or variation of call processing systems. Call processing system 104 communicates with mobile communication device 101, call conference server 106, and public safety answering point 108.

Call conference server 106 comprises a computer system and a communication interface that allows telecommunications relay service 110 to communicate with public safety answering point 108. In operation, call conference server 106 receives calls from public safety answering point 108 and telecommunications relay service 110. Call conference server 106 then connects the calls from public safety answering point 108 and telecommunications relay service 110 so that an operator at public safety answering point 108 and an operator at telecommunications relay service 110 can exchange communications relating to an emergency call placed by the use of mobile communication device 101. Call conference server 106 communicates with call processing system 104, public safety answering point 108, and telecommunications relay service 110.

Public safety answering point 108 is any system or collection of systems capable of dispatching emergency services to the location of mobile communication device 101. Additionally, public safety answering point 108 is capable of placing a call to call conference server 106 in response to receiving call setup signaling from call processing system 104. Public safety answering point 108 communicates with call processing system 104 and call conference server 106. Public safety answering point 108 also communicates with telecommunications relay service 110 through call conference server 106.

Telecommunications relay service 110 comprises a computer system and a communication interface that allows hearing impaired or speech disabled users to place calls to standard telephone users via an assistive telephone device, such as a telecommunications device for the deaf (TDD), telephone typewriter (TTY), personal computer, laptop, mobile phone, PDA, or any other type of assistive telephone device. Telecommunications relay service 110 allows a hearing impaired user of mobile communication device 101 to request emergency services from public safety answering point 108. Additionally, telecommunications relay service 110 is capable of placing a call to call conference server 106 in response to receiving a TRS request from mobile communication device 101. Telecommunications relay service 110 communicates with mobile communication device 101. Telecommunications relay service 110 also communicates with public safety answering point 108 through call conference server 106.

In operation, communication system 100 allows a hearing or speech impaired user of mobile communication device 101 to communicate with an operator at PSAP 108. In an example, a hearing impaired user places an emergency call to call processing system 104. In response, call processing system 104 transmits call setup signaling to PSAP 108 and transmits a service number to mobile communication device 101. Additionally, when the hearing impaired user places the emergency call, a TRS request is sent to TRS 110 and a TRS session is established between the user and an operator at TRS 110. Call conference server 106 then receives calls from PSAP 108 and TRS 110 and connects the calls to each other to create a conference call. This conference call allows the hearing impaired user to communicate via an assistive keyboard device with the TRS operator, who then can relay typed messages from the user as voice messages to the PSAP operator. Likewise, the TRS operator can also relay voice messages from the PSAP operator to the user.

Figure 3:
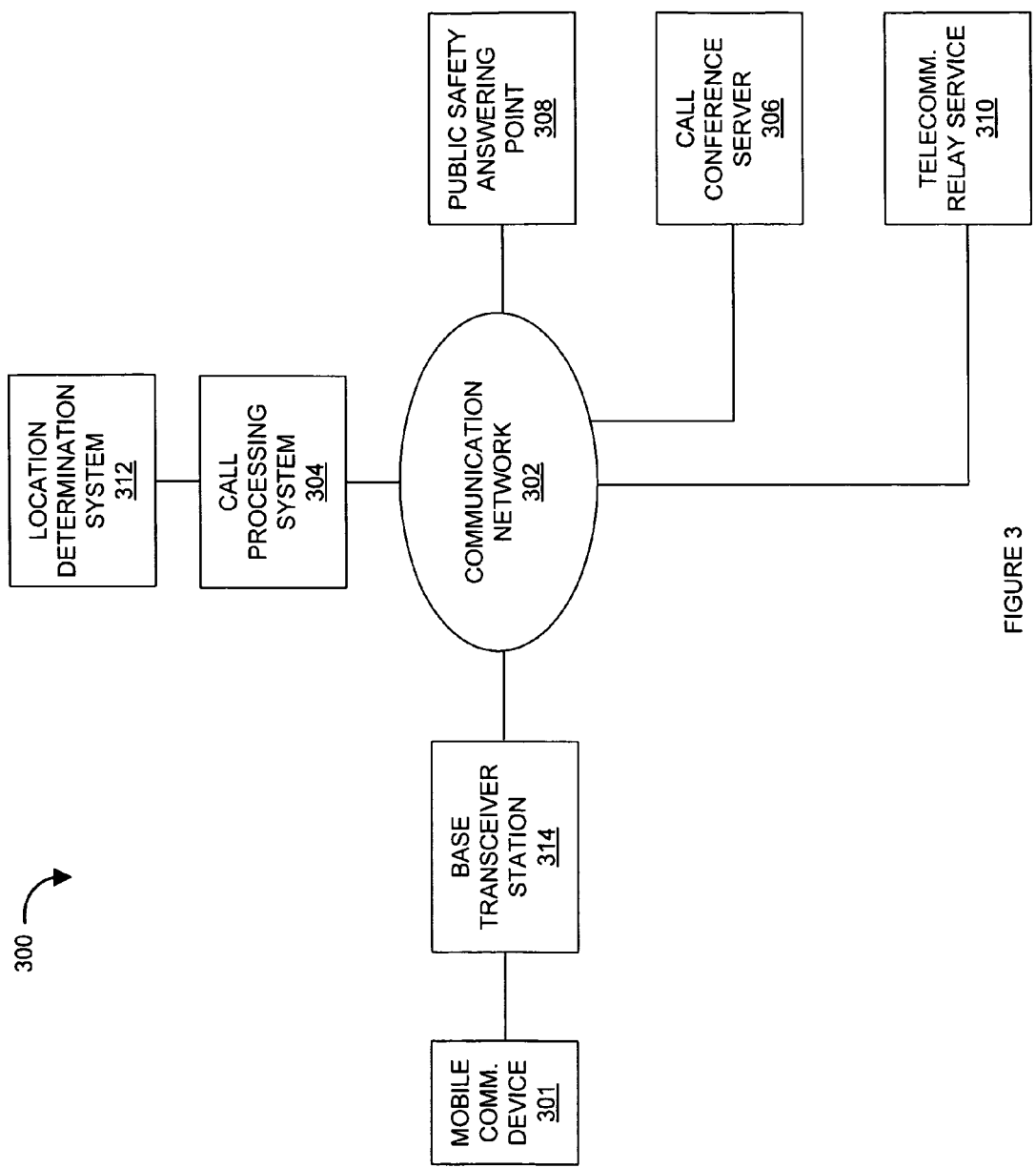
FIG. 3 is a block diagram illustrating communication system 300.

FIG. 3 is a block diagram illustrating communication system 300. Communication system 300 includes mobile communication device 301, communication network 302, call processing system 304, call conference server 306, public safety answering point 308, telecommunications relay service 310, location determination system 312, and base transceiver station 314. Mobile communication device 301 communicates with communication network 302 through base transceiver station 314. Communication network 302 is coupled to call processing system 304, call conference server 306, public safety answering point 308, and telecommunications relay service 310. Call processing system 304 communicates with call conference server 306, public safety answering point 308, and telecommunications relay service 310 through communication network 302. Call processing system 304 communicates with location determination system 312. Call conference server 306 communicates with public safety answering point 308 and telecommunications relay service 310 through communication network 302. Thus, telecommunications relay service 310 communicates with mobile communication device 301 and public safety answering point 308 over the systems and networks described above.

Mobile communication device 301 comprises Radio Frequency (RF) communication circuitry and an antenna. The RF communication circuitry typically includes an amplifier, filter, modulator, and signal processing circuitry. Mobile communication device 301 may also include a user interface, memory device, software, processing circuitry, or some other communication components. Mobile communication device 301 is any device capable of placing an emergency call to communication network 302. Mobile communication device 301 may be a mobile phone, a personal computer, a laptop, or a personal digital assistant (PDA), as well other types or combinations of mobile communication devices.

Communication network 302 comprises wireless communication networks, wireline communication networks, or packet communication networks, as well as any combination or variation thereof. Communication network 302 communicates with mobile communication device 301, call processing system 304, call conference server 306, public safety answering point 308, and telecommunications relay service 310.

Call processing system 304 comprises a computer system and a communication interface. Call processing system 304 may also include other components such a router, server, data storage system, and power supply. Call processing system 304 may reside in a single device or may be distributed across multiple devices. Call processing system 304 could be a mobile switching center, an IP multimedia subsystem, a base station controller, an access service node, or any other type, combination, or variation of call processing systems. Call processing system 304 communicates with mobile communication device 301, call conference server 306, and public safety answering point 308.

Call conference server 306 comprises interfaces and circuitry that allows telecommunications relay service 310 to communicate with public safety answering point 308. In operation, call conference server 306 receives calls from public safety answering point 308 and telecommunications relay service 310. Call conference server 306 then connects the calls from public safety answering point 308 and telecommunications relay service 310 so that an operator at public safety answering point 308 and an operator at telecommunications relay service 310 can exchange communications relating to an emergency call placed by the use of mobile communication device 301. Call conference server 306 communicates with call processing system 304, public safety answering point 308, and telecommunications relay service 310.

Public safety answering point 308 is any system or collection of systems capable of dispatching emergency services to the location of mobile communication device 301. Additionally, public safety answering point 308 is capable of placing a call to call conference server 306 in response to receiving call setup signaling from call processing system 304. Public safety answering point 308 communicates with call processing system 304 and call conference server 306. Public safety answering point 308 also communicates with telecommunications relay service 310 through call conference server 306.

Telecommunications relay service 310 comprises interfaces and circuitry that allow hearing impaired or speech disabled people to place calls to standard telephone users via an assistive device, such as a TDD, a TTY, personal computer, laptop, mobile phone, PDA, or any other type of assistive telephone device. Telecommunications relay service 310 allows a hearing impaired user of mobile communication device 301 to request emergency services from public safety answering point 308. Additionally, telecommunications relay service 310 is capable of placing a call to call conference server 306 in response to receiving a TRS request from mobile communication device 301. Telecommunications relay service 310 communicates with mobile communication device 301. Telecommunications relay service 310 also communicates with public safety answering point 308 through call conference server 306.

Location determination system 312 is any system or collection of systems capable of providing location provisioning services for emergency calls placed by mobile communication device 301. Location determination system 312 communicates with call processing system 304.

Base transceiver station 314 comprises interfaces and circuitry that allows wireless communications to be exchanged between mobile communication device 301 and communication network 302. Base transceiver station 314 communicates with mobile communication device 301 and communication network 302.

Figure 4:
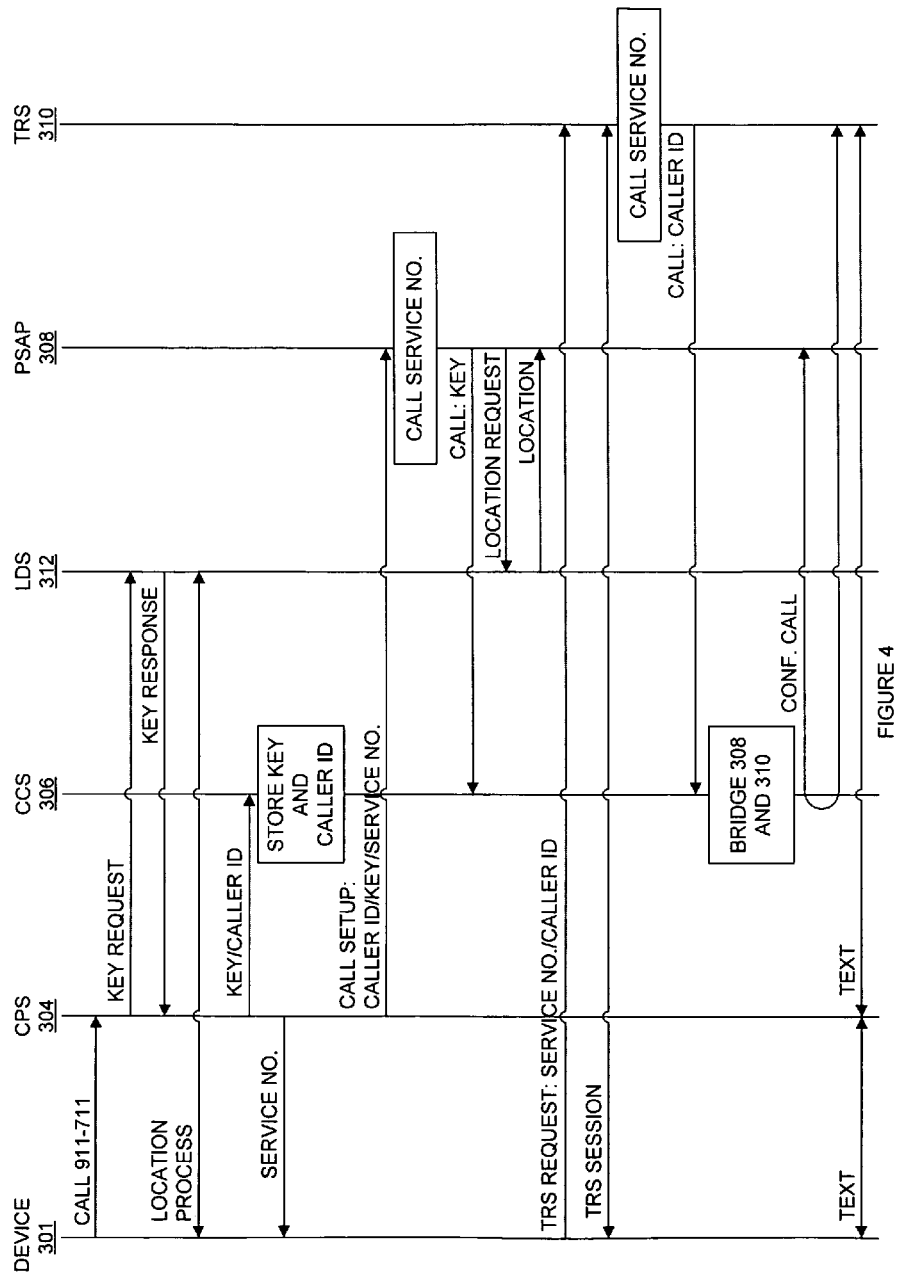
FIG. 4 is a flow diagram illustrating the operation of communication system 300.

FIG. 4 is a flow diagram illustrating the operation of communication system 300. As shown in FIG. 4, call processing system 304 receives an emergency call from mobile communication device 301. The emergency call could be in the form of dialed digits, such as 9-1-1 or 9-1-1-7-1-1. Alternatively, the user input could be an emergency call button located on mobile communication device 301. The emergency call comprises a caller identification. The caller identification could be a telephone number associated with mobile communication device 301, a name associated with the telephone number of mobile communication device 301, or both. The caller identification may be used to determine that the caller is hearing impaired or speech disabled. Additionally, call processing system 304 may contain a database that lists telephone numbers, user names, and whether the user is hearing impaired. In an example, call processing system 304 would use the database and the caller identification to determine that the user of mobile communication device 301 is hearing impaired.

Call processing system 304 then transfers a key request to location determination system 312. The key request includes the caller identification. Location determination system 312 processes the key request to select a key that will be used going forward to identify the call. Location determination system 312 returns a key response to call processing system 304 indicating the key. Location determination system 312 also stores the caller identification in association with the key for later queries by other systems. Additionally, location determination system 312 determines the location of mobile communication device 301, such as by employing GPS, triangulation, or other such location schemes.

Call processing system 304 then transmits the key and the caller identification to call conference server 306. In response, call conference server 306 stores the key and the caller identification. Call processing system 304 also transmits a service number to mobile communication device 301. Additionally, call processing system 304 transmits call setup signaling to public safety answering point 308. The call setup signaling comprises the key, the caller identification, and the service number. In an example, the service number is contained in the call back number field of an initial address message.

After call processing system 304 transmits the call setup signaling to public safety answering point 308, call conference server 306 receives a call from public safety answering point 308. The call from public safety answering point 308 is made using the service number received from call processing system 304. Additionally, the call comprises the key.

Public safety answering point 308 also transmits a location request to location determination system 312. The location request indicates the key. Location determination system 312 processes the key to determine the caller identification associated with the key. Location determination system 312 then returns a response to public safety answering point 308 that indicates the location of mobile communication device 301. Additionally, a dispatcher communicates the location of the call to response personnel responding to the emergency.

Mobile communication device 301 transmits a telecommunications relay service (TRS) request to telecommunications relay service 310. The TRS request comprises the service number and the caller identification. Additionally, after the TRS request is received by telecommunications relay service 310, a TRS session is established between mobile communication device 301 and telecommunications relay service 310. The TRS session allows the hearing impaired or speech disabled user of mobile communication device 301 to communicate with an operator at telecommunications relay service 310 via an assistive telephone device, such as a TTY or a personal computer.

After telecommunications relay service 310 receives the TRS request call from mobile communication device 301, call conference server 306 receives a call from telecommunications relay service 310. The call from telecommunications relay service 310 is made using the service number received from mobile communication device 301. Additionally, the call comprises the caller identification, which is used by call conference server 306 to connect telecommunications relay service 310 to the conference bridge used to host the conference call with public safety answering point 308. After receiving the calls from public safety answering point 308 and telecommunications relay service 310, call conference server 306 connects the calls to each other to create a conference call.

Upon completion of the conference call setup between public safety answering point 308 and telecommunications relay service 310, the user of mobile communication device 301 will be able to communicate with the telecommunications relay service 310 operator with an assistive telephone device. Accordingly, this will allow the user to provide information relating to the emergency call to the operator at telecommunications relay service 310, who can in turn relay that information to the operator at public safety answering point 308.

FIG. 5 is a flow diagram illustrating the operation of communication system 300. As shown in FIG. 5, call processing system 304 receives an emergency call from mobile communication device 301. The emergency call could be in the form of dialed digits, such as 9-1-1, 9-1-1-7-1-1, 1+911-711, *(star)-911-711, or #-911-711, including any combinations or variations thereof. It should be understood that digits other than those described could be dialed to make an emergency call. Alternatively, the user input could be an emergency call button located on mobile communication device 301. The emergency call comprises a caller identification. In this example, the caller identification is a telephone number associated with mobile communication device 301.

Call processing system 304 then transfers a key request to location determination system 312. The key request includes the caller identification. Location determination system 312 processes the key request to select a key that will be used going forward to identify the call. Location determination system 312 returns a key response to call processing system 304 indicating the key. Location determination system 312 also stores the caller identification in association with the key for later queries by other systems. Additionally, location determination system 312 determines the location of mobile communication device 301, such as by employing GPS, triangulation, or other such location schemes.

Call processing system 304 then transmits the key and the caller identification to call conference server 306. In response, call conference server 306 stores the key and the caller identification. Additionally, call processing system 304 transmits call setup signaling to public safety answering point 308. The call setup signaling comprises the key, the caller identification, and a service number. In an example, the service number is a phone number that will be transmitted to public safety answering point 308 and telecommunications relay service 310.

After call processing system 304 transmits the call setup signaling to public safety answering point 308, call conference server 306 receives a call from public safety answering point 308. The call from public safety answering point 308 is made using the service number received from call processing system 304. Additionally, the call comprises the key.

Public safety answering point 308 also transmits a location request to location determination system 312. The location request indicates the key. Location determination system 312 processes the key to determine the caller identification associated with the key. Location determination system 312 then returns a response to public safety answering point 308 that indicates the location of mobile communication device 301. Additionally, a dispatcher communicates the location of the call to response personnel responding to the emergency.

Call processing system 304 transmits a telecommunications relay service (TRS) request to telecommunications relay service 310. The TRS request comprises the service number and the caller identification. Additionally, after the TRS request is received by telecommunications relay service 310, a TRS session is established between mobile communication device 301 and telecommunications relay service 310. The TRS session allows the hearing impaired or speech disabled user of mobile communication device 301 to communicate with an operator at telecommunications relay service 310 via an assistive telephone device, such as a TTY or a personal computer.

After telecommunications relay service 310 receives the TRS request call from call processing system 304, call conference server 306 receives a call from telecommunications relay service 310. The call from telecommunications relay service 310 is made using the service number received from call processing system 304. Additionally, the call comprises the caller identification, which is used by call conference server 306 to connect telecommunications relay service 310 to the conference bridge used to host the conference call with public safety answering point 308. After receiving the calls from public safety answering point 308 and telecommunications relay service 310, call conference server 306 connects the calls.

Upon completion of the conference call setup between public safety answering point 308 and telecommunications relay service 310, the user of mobile communication device 301 will be able to communicate with the telecommunications relay service 310 operator with an assistive telephone device. Accordingly, this will allow the user to relate information relating to the emergency call to the operator at telecommunications relay service 310, who can in turn relay that information to the operator of the public safety answering point 308.

Advantageously, communication systems 100 and 300 allow for the ability to recognize if a caller is hearing impaired or speech disabled and to allow the caller to communicate with an emergency PSAP operator through a TRS operator. The TRS operator can understand both the text communications from the caller and the voice communications from the PSAP operator and can relay information between the caller and the PSAP operator. Furthermore, communication system 300 also allows for automatic location determination of the caller to be initiated upon receipt of an emergency call without the need for the caller to communicate their location to the TRS or PSAP operators.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system comprising:
a call processing system configured to receive a call request for a first call from a mobile device operated by a user, wherein the call request comprises a user input and a caller identification, transfer a key and the caller identification to a call conference server, transfer the caller identification, the key, and a service number to a public safety answering point (PSAP), and transfer the service number to the mobile device; and
the call conference server configured to store the key and the caller identification, receive a second call from the PSAP that includes the key, receive a third call from a telecommunications relay service that includes the caller identification, and connect the third call to the second call based on the caller identification and the key.

2. The communication system of claim 1 further comprising a location determination system configured to receive a key request from the call processing system and responsively transfer a key response to the call processing system, wherein the key response indicates the key.

3. The communication system of claim 2 wherein the location determination system is further configured to receive a location request from the PSAP including the key, determine a location of the mobile device based on the key, and transfer the location of the mobile device to the PSAP.

4. The communication system of claim 3 wherein the telecommunications relay service is configured to receive a telecommunications relay service request from the mobile device that indicates the caller identification and the service number and, in response, initiate the third call.

5. The communication system of claim 4 wherein the telecommunications relay service is configured to establish a relay session with the mobile device, in response to the telecommunications relay request.

6. The communication system of claim 1 wherein the user input comprises digits dialed by the user on the mobile device and indicates that the first call is an emergency call.

7. The communication system of claim 6 wherein the digits comprise 9-1-1-7-1-1.

8. The communication system of claim 1 wherein the second call is made by calling the service number.

9. The communication system of claim 1 wherein the third call is made by calling the service number.

10. The communication system of claim 1 wherein the call processing system transfers the service number to the PSAP in a call back number field of an initial address message.

11. A method of operating a communication system, the method comprising:
in a call processing system, receiving a call request for a first call from a mobile device operated by a user, wherein the call request comprises a user input and a caller identification, transferring a key and the caller identification to a call conference server, transferring the caller identification, the key, and a service number to a public safety answering point (PSAP), and transferring the service number to the mobile device; and
in the call conference server, storing the key and the caller identification, receiving a second call from the PSAP that includes the key, receiving a third call from a telecommunications relay service that includes the caller identification, and connecting the third call to the second call based on the caller identification and the key.

12. The method of claim 11 further comprising, in a location determination system, receiving a key request from the call processing system and responsively transferring a key response to the call processing system, wherein the key response indicates the key.

13. The method of claim 12 further comprising, in the location determination system, receiving a location request from the PSAP including the key, determining a location of the mobile device based on the key, and transferring the location of the mobile device to the PSAP.

14. The method of claim 13 further comprising, in the telecommunications relay service, receiving a telecommunications relay service request from the mobile device that indicates the caller identification and the service number and, in response, initiating the third call.

15. The method of claim 14 further comprising, in the telecommunications relay service, establishing a relay session with the mobile device, in response to the telecommunications relay request.

16. The method of claim 11 wherein the user input comprises digits dialed by the user on the mobile device and indicates that the first call is an emergency call.

17. The method of claim 16 wherein the digits comprise 9-1-1-7-1-1.

18. The method of claim 11 wherein the second call is made by calling the service number.

19. The method of claim 11 wherein the third call is made by calling the service number.

20. The method of claim 11 further comprising, in the call processing system, transferring the service number to the PSAP in a call back number field of an initial address message.

* * * * *